US012611650B2

(12) United States Patent
Kitagawa et al.

(10) Patent No.: US 12,611,650 B2
(45) Date of Patent: Apr. 28, 2026

(54) ELECTRET AND FILTER USING THE SAME

(71) Applicant: TOYOBO CO., LTD., Osaka (JP)

(72) Inventors: Yoshiyuki Kitagawa, Otsu (JP); Satoru Harada, Otsu (JP); Keiko Sakaguchi, Otsu (JP); Sadahito Goto, Osaka (JP)

(73) Assignee: TOYOBO MC CORPORATION, Osaka (JP)

( * ) Notice: Subject to any disclaimer, the term of this patent is extended or adjusted under 35 U.S.C. 154(b) by 932 days.

(21) Appl. No.: 17/635,623

(22) PCT Filed: Aug. 19, 2020

(86) PCT No.: PCT/JP2020/031197
§ 371 (c)(1),
(2) Date: Feb. 15, 2022

(87) PCT Pub. No.: WO2021/033700
PCT Pub. Date: Feb. 25, 2021

(65) Prior Publication Data
US 2022/0288560 A1 Sep. 15, 2022

(30) Foreign Application Priority Data
Aug. 21, 2019 (JP) ................................. 2019-151213

(51) Int. Cl.
| | |
|---|---|
| *B01J 20/26* | (2006.01) |
| *B01D 39/16* | (2006.01) |
| *B01D 46/00* | (2022.01) |
| *B01J 20/22* | (2006.01) |
| *B01J 20/28* | (2006.01) |
| *B01J 20/30* | (2006.01) |

(52) U.S. Cl.
CPC ........ *B01J 20/261* (2013.01); *B01D 39/1623* (2013.01); *B01D 46/0032* (2013.01); *B01J 20/223* (2013.01); *B01J 20/28011* (2013.01); *B01J 20/28023* (2013.01); *B01J 20/3007* (2013.01); *B01D 2239/0435* (2013.01); *B01D 2239/0622* (2013.01)

(58) Field of Classification Search
CPC ....... C08L 23/0815; C08K 3/22; C08K 5/098; C08K 5/17
See application file for complete search history.

(56) References Cited

U.S. PATENT DOCUMENTS

| | | | |
|---|---|---|---|
| 2005/0077646 A1 | 4/2005 | Akiba et al. | |
| 2006/0079145 A1 | 4/2006 | Cox | |
| 2013/0288555 A1 | 10/2013 | Berkemann et al. | |
| 2016/0067717 A1 | 3/2016 | Schultz et al. | |
| 2019/0003112 A1 | 1/2019 | Schultz et al. | |

FOREIGN PATENT DOCUMENTS

| | | |
|---|---|---|
| JP | 2013-540904 A | 11/2013 |
| JP | 2016-520728 A | 7/2016 |
| JP | 2018-40098 A | 3/2018 |
| JP | 2018040098 A | 3/2018 |
| JP | 6346640 B2 | 6/2018 |
| JP | 2018-523761 A | 8/2018 |
| JP | 2018-202369 A | 12/2018 |
| WO | 03/060216 A1 | 7/2003 |

OTHER PUBLICATIONS

Office Action dated Jan. 19, 2023, issued in counterpart CN Application No. 202080057987.4, with English translation. (12 pages).
International Search Report dated Oct. 27, 2020, issued in counterpart International Application No. PCT/JP2020/031197. (2 pages).
Office Action dated Aug. 11, 2023, issued in counterpart IN application No. 202247012791, with English translation. (5 pages).
Extended (Supplementary) European Search Report dated Aug. 11, 2023, issued in counterpart EP application No. 123456789.9. (7 pages).
Office Action dated Jul. 9, 2025, issued in counterpart KR Application No. 10-2022-7006757, with English translation. (11 pages).

*Primary Examiner* — Wenwen Cai
(74) *Attorney, Agent, or Firm* — WHDA, LLP

(57) ABSTRACT

It is provided that an electret having excellent filtering performance and a filter using the electret even in a case where polyolefin resin and magnesium element are contained. An electret comprising a polyolefin resin and a nitrogen-containing compound, wherein 0.1 to 5 parts by mass of the nitrogen-containing compound is contained in 100 parts by mass of the polyolefin resin, a proportion of a magnesium element contained in the electret is 5 to 100 ppm, and a QF value represented by the following formula is not less than 1.00 mmAq$^{-1}$ when particles having particle diameters of 0.3 to 0.5 μm are to be collected.

$$QF\ [mmAq^{-1}] = -[ln(particle\ penetration(\%)/100)]/[ventilation\ resistance\ (mmAq)]$$

4 Claims, No Drawings

ELECTRET AND FILTER USING THE SAME

TECHNICAL FIELD

The present invention relates to an electret and a filter using the same.

BACKGROUND ART

Conventionally, porous filters have been used for dust protective masks, various air-conditioning elements, air cleaners, cabin filters, and various devices for purposes of dust collection, protection, ventilation, and the like.

Among the porous filters, filters formed of fibrous products have high porosity and are advantageous in that their life span is long and ventilation resistance is low, and are thus widely used. In the filters formed of the fibrous products, particles are collected on fibers by mechanical collecting mechanisms such as contact-adhesion, diffusion, and inertial impaction. It is known that the filter has the lowest particle collecting efficiency in a practical application environment in a case where the aerodynamic equivalent diameters of collected particles are about 0.1 to 1.0 μm, although the mechanisms vary according to physical properties of particles, a fiber diameter of the filter, a passing air velocity for a particle, or the like.

A method using electric attraction in combination in order to enhance particle collecting efficiency of a filter for particles having the aerodynamic equivalent diameters of about 0.1 to 1.0 μm, is known. For example, a method in which electric charge is applied to particles to be collected, a method in which electric charge is applied to the filter, and a method in which the filter is set in an electric field, are known. A method in which a plurality of the above-described methods are used in combination is also known. As a method in which electric charge is applied to the filter, a method in which the filter is disposed between electrodes and dielectric polarization is caused at the time of ventilation, and a method in which long-life electrostatic charge is applied to an insulating material, are known. Particularly in the latter method, energy from an external power supply or the like is unnecessary, and a filter containing such an insulating material is thus widely used as an electret filter.

It is known that an electret is preferably formed by applying an electrostatic charge to a fibrous product in a method (liquid contact charging method) in which liquid is brought into contact or collision with the fibrous product in order to enhance the collecting efficiency of the electret filter. For example, an electret in which an electrostatic charge is applied by bringing, into contact with liquid such as water, a fibrous product formed of a mixture in which a nitrogen-containing compound such as a hindered-amine-based compound is added to resin that contains polyolefin resin as a main component, is known as an electret having a good balance between cost and performance.

Patent Documents 1 to 3 disclose an electret web in which a fibrous product that contains polyolefin resin as a main component is charged by the liquid contact charging method. Patent Document 1 discloses a nonwoven electret web including fiber produced from a thermoplastic polymer material. The thermoplastic polymer material includes a polymer, a first additive (a) for trapping electric charge generated in the fiber by treatment with polar liquid, and a second additive (b) including organic amide derived from carboxylic acid having 29 to 50 carbon atoms and aliphatic amine having one or two primary and/or secondary amino groups and 1 to 6 carbon atoms in an aliphatic group. Patent Document 2 discloses an electret material in which a reinforcing material is stacked on a carrier carrying fluorine and having an electrostatic charge applied thereto. Patent Document 3 discloses an electret web including thermoplastic resin and a predetermined electric charge enhancing additive.

PRIOR ART DOCUMENTS

Patent Documents

Patent Document 1: Japanese Patent No. 6346640
Patent Document 2: Japanese Unexamined Patent Application Publication No. 2018-202369
Patent Document 3: Japanese Translation of PCT International Application Publication No. 2018-523761

SUMMARY OF THE INVENTION

Problems to be Solved by the Invention

In the above-described Patent Documents, there is room for improvement in filtering performance in a case where the electret or the electret filter contains polyolefin resin and magnesium element.

Solutions to the Problems

The inventors of the present invention have found, as a result of thorough studies, that an electret having excellent filtering performance and a filter using the electret are obtained by lowering a proportion of contained magnesium element, to complete the present invention. That is, the invention includes the following inventions.

[1] An electret comprising a polyolefin resin and a nitrogen-containing compound, wherein 0.1 to 5 parts by mass of the nitrogen-containing compound is contained to 100 parts by mass of the polyolefin resin, a proportion of a magnesium element contained in the electret is 5 to 100 ppm, and a QF value represented by the following formula is not less than 1.00 $mmAq^{-1}$ when particles having particle diameters of 0.3 to 0.5 μm are to be collected.

$$QF\ [mmAq^{-1}] = -[\ln(\text{particle penetration}(\%)/100)]/[\text{ventilation resistance (mmAq)}]$$

[2] The electret according to the above [1], comprising fatty acid magnesium salt.

[3] The electret according to the above [1] or [2], wherein the nitrogen-containing compound contains a hindered-amine-based compound.

[4] The electret according to any one of the above [1] to [3], wherein the electret is a fiber aggregate.

[5] The electret according to any one of the above [1] to [4], wherein the electret is produced by a meltblown method.

[6] A filter comprising the electret according to any one of the above [1] to [5].

Effect of the Invention

The electret and the filter using the same have an excellent QF value.

MODE FOR CARRYING OUT THE INVENTION

The electret of the present invention comprises a polyolefin resin and a nitrogen-containing compound, 0.1 to 5 parts by mass of the nitrogen-containing compound is contained with respect to 100 parts by mass of the polyolefin resin, a proportion of a magnesium element contained in the electret is 5 to 100 ppm, and a QF value of the electret is not less than 1.00 mmAq$^{-1}$.

<Polyolefin Resin>

For the electret of the present invention, polyolefin resin having high electric resistance and hydrophobicity is used from the viewpoint of a degree of freedom for shape and electric charge stability of the electret. Examples of the polyolefin resin include homopolymers of olefins such as ethylene, propylene, butylene, hexene, octene, butadiene, isoprene, chloroprene, methyl-1-pentene, and cyclic olefins, and copolymers each formed of two or more of the above-described olefins. As the polyolefin resin, one of the above-described polymers or copolymers may be selected and used alone, or two or more of them may be selected and used in combination. The polyolefin resin preferably contains at least one selected from the group consisting of polypropylene and polymethylpentene, and more preferably contains polypropylene. In 100 parts by mass of the electret, a proportion of the polyolefin resin is preferably 80 parts by mass or more, more preferably 85 parts by mass or more, further preferably 90 parts by mass or more, particularly preferably 95 parts by mass or more, and most preferably 97 parts by mass or more. The upper limit of the proportion of the polyolefin resin is not particularly limited and for example 99.5 parts by mass or less, preferably 99 parts by mass or less. As in, for example, sheath/core fiber or side-by-side fiber, in a case where contained resins are different between the left and the right sides of the fiber or between the core and the sheath, only a portion that contains the polyolefin resin serves as the electret of the present Invention.

<Nitrogen-Containing Compound>

A proportion of the nitrogen-containing compound with respect to 100 parts by mass of the polyolefin resin is 0.1 to 5 parts by mass, preferably 0.5 to 3 parts by mass, and more preferably 0.75 to 1.5 parts by mass. In a case where two or more kinds of fibers are mixed in the electret, or two or more kinds of resins are mixed in one kind of fiber in the electret, the proportion refers to a proportion of the nitrogen-containing compound contained in the polyolefin resin. Even in a case where resin other than the polyolefin is contained in the electret, the resin other than the polyolefin is dissolved in solvent/acid-base or has different dyeability, and, therefore, the polyolefin resin can be identified. The polyolefin resin can also be identified by a quantitative method such as DSC and NMR. In a case where the proportion of the contained nitrogen-containing compound is less than 0.1 parts by mass, a charge amount is reduced and the filtering properties are thus degraded. In a case where the proportion thereof is larger than 5 parts by mass, increase of hygroscopicity causes loss of stability as the electret.

A proportion of the nitrogen-containing compound contained to 100 parts by mass of the electret is preferably 0.1 to 5 parts by mass, more preferably 0.5 to 3 parts by mass, and further preferably 0.75 to 1.5 parts by mass. Within the above-described range, the filtering properties can be enhanced and hygroscopicity is reduced, whereby stability as the electret can be enhanced.

Although the nitrogen-containing compound is not particularly limited as long as the above-described characteristics are obtained as desired, the nitrogen-containing compound is preferably a hindered-amine-based compound including at least one of a 2,2,6,6-tetramethylpiperidyl structure and a triazine structure, and the hindered-amine-based compound more preferably includes a 2,2,6,6-tetramethylpiperidine structure and a triazine structure.

Although the hindered-amine-based compound is not particularly limited, examples thereof include poly[{6-(1,1,3,3-tetramethylbutyl)amino-1,3,5-triazine-2,4-diyl}{(2,2,6,6-tetramethyl-4-piperidy)imino}hexamethylene{(2,2,6,6-tetramethyl-4-piperidy)imino}] (Chimassorb (registered trademark) 944LD, manufactured by BASF Japan), poly-condensate of dimethyl succinate-1-(2hydroxyethyl)-4-hydroxy-2,2,6,6-tetramethyl-4-piperidine (Tinuvin (registered trademark) 622LD, manufactured by BASF Japan), 2-[[3,5-bis(1,1-dimethylethyl)-4-hydroxyphenyl]methyl]-2-butyl-propanedioic acid bis[1,2,2,6,6-pentamethyl-4-piperidinyl] (Tinuvin (registered trademark) 144, manufactured by BASF Japan), polycondensate of dibutylamine 1,3,5-triazine·N,N-bis(2,2,6,6-tetramethyl-4-piperidyl)-1,6-hexamethylenediamine·N-(2,2,6,6-tetramethyl-4-piperidyl) butylamine (Chimassorb (registered trademark) 2020FDL, manufactured by BASF Japan), and 2-(4,6-diphenyl-1,3,5-triazine-2-yl)-5-(hexyloxy)-phenol (Tinuvin (registered trademark) 1577FF, manufactured by BASF Japan). Among them, a hindered amine-based compound containing a 2,2,6,6-tetramethylpiperidine structure and a triazine structure is preferable, and Chimassorb (registered trademark) 944LD or Chimassorb (registered trademark) 2020FD is more preferable. As the hindered-amine-based compound, one of the above-described compounds may be used alone or two or more thereof may be used in combination.

<Magnesium Element>

A proportion of a magnesium element contained in the electret is not less than 5 ppm and not larger than 100 ppm, preferably not less than 10 ppm and not larger than 70 ppm, more preferably not less than 15 ppm and less than 40 ppm, and further preferably not less than 15 ppm and not larger than 35 ppm. In both a case where the content of the magnesium element is too small and a case where the content of the magnesium element is too large, a charge amount is small in the electret, and, thus, the ventilation resistance is low and filtering performance is also insufficient.

A proportion of the magnesium element contained with respect to 100 parts by mass of the polyolefin resin is preferably not less than 5 ppm and not larger than 100 ppm, more preferably not less than 10 ppm and not larger than 70 ppm, further preferably not less than 15 ppm and less than 40 ppm, and particularly preferably not less than 15 ppm and not larger than 35 ppm. In a case where two or more kinds of fibers are mixed in the electret, or two or more kinds of resins are mixed in one kind of fiber in the electret, the proportion refers to a proportion of the magnesium element mixed in the polyolefin resin. In a case where the content of the magnesium element is within the above-described range, the electret can have a high ventilation resistance and high filtering performance.

A method for adding the magnesium element to the polyolefin resin is not particularly limited as long as characteristics are obtained as desired. Preferably, melt-mixing, dissolve-mixing, ion collision, transpiration-adhesion, supercritical treatment, adsorption treatment, or the like is performed such that the magnesium element is present in at least a part of a surface of the electret. The polyolefin resin is stable with respect to an organic solvent and acid/alkaline aqueous solution. Therefore, in a case where mixing or the like is performed, crush-mixing or disperse-mixing is preferably performed or excellent melt-mixing properties are preferably imparted to a magnesium compound. A method in which a magnesium compound is previously added at the time of polymerization of the polyolefin resin, is also preferable.

For the method for adding the magnesium element to the polyolefin resin having excellent uniformity and processability, for example, a magnesium compound as magnesium salt, ionomer, various chelates, or the like can be used. Among them, fatty acid magnesium salt as a complex with an organic substance is preferably dissolved in melted polyolefin resin.

The electret of the present invention preferably contains magnesium salt, more preferably contains at least one selected from the group consisting of fatty acid magnesium salt, alicyclic acid magnesium salt, and aromatic magnesium salt, and further preferably contains fatty acid magnesium salt, from the viewpoint of excellent miscibility with polyolefin and excellent thermal stability. A melting point of the magnesium salt is preferably not lower than 80° C. and more preferably not lower than 100° C. A thermal decomposition temperature is preferably not lower than 200° C. In a case where the thermal decomposition temperature or the melting point is low, stickiness or dissipation of a decomposed product may occur during processing or use. The upper limit of the thermal decomposition temperature or the melting point of the magnesium salt is not particularly limited and for example, not higher than 300° C.

Although the fatty acid magnesium salt is not particularly limited, the fatty acid magnesium salt preferably contains a C10 to C50 fatty acid group, more preferably contains a C12 to C30 fatty acid group, and further preferably contains a C16 to C22 fatty acid group. The fatty acid magnesium salt preferably has a linear fatty acid group. The number of fatty acid chains to be bound to magnesium may be one or two, but is preferably two. Specific examples of the fatty acid magnesium salt include magnesium salts of linear saturated fatty acids such as magnesium laurate, magnesium myristate, magnesium palmitate, magnesium stearate, and magnesium behenate; and magnesium salts of linear unsaturated fatty acids such as magnesium oleate and erucic acid magnesium. From the viewpoint of the melting point and reactivity, the magnesium salt of the linear saturated fatty acid is preferable and magnesium stearate is more preferable.

In the present invention, the above-described characteristics can be exhibited by one component by using a component in which the magnesium compound and the nitrogen-containing compound are previously integrated with each other. A method for preparing the magnesium compound or a method for producing the magnesium compound is not particularly limited. A commercially available magnesium compound may be used. The magnesium compound may be produced by using magnesium before the integration. A chelate compound and magnesium may be separately added to cause a reaction by a method such as melting before processing of the electret.

Metal elements other than magnesium element are preferably contained in a very small amount or are preferably not contained at all since the metal elements inhibit stability and electric charge stability of the polyolefin resin as a polymer, and generation of electric charge. The metal elements other than magnesium element in the electret contained in an amount of preferably 500 ppm or less for each metal element, more preferably 250 ppm or less for each metal element, further preferably 100 ppm or less for each metal element, and most preferably 50 ppm or less for each metal element. In particular, it is preferable that the alkali metal and the colored transition metal element are not contained, and specifically, the total content of the alkali metal and the colored transition metal element in the electret is preferably 100 ppm or less, more preferably 50 ppm or less, further preferably 25 ppm or less, and most preferably 10 ppm or less.

<Physical Properties of Electret>

QF value of the electret of the present invention is 1.00 mmAq$^{-1}$ or more, preferably 1.20 mmAq$^{-1}$ or more, and more preferably 1.45 mmAq$^{-1}$ or more. The upper limit of the QF value is not particularly limited, for example 6.00 mmAq$^{-1}$ or less, preferably 4.0 mmAq$^{-1}$ or less, and more preferably 2.00 mmAq$^{-1}$ or less. If the QF value is less than 1.00 mmAq$^{-1}$, the particles are not sufficiently captured by the electret and the filtering performance is insufficient. The QF value is a value calculated by the following formula, and the method for measuring the particle penetration and the ventilation resistance will be described later. Further, in the present specification, the "particle penetration" refers to the particle penetration when particles having particle diameters of 0.3 to 0.5 μm are to be collected.

$$QF\ [mmAq^{-1}] = -[\ln(particle\ penetration(\%)/100)]/[ventilation\ resistance\ (mmAq)]$$

The particle penetration of the electret of the present invention is preferably 15% or less, more preferably 5% or less, further preferably 2% or less, and particularly preferably 0.5% or less. The lower limit of the particle penetration is not particularly limited, for example 0.00001% or more in consideration of the balance with ventilation.

The ventilation resistance of the electret of the present invention is preferably 1.0 mmAq or more, and more preferably 2.0 mmAq or more, further preferably 3.0 mmAq or more. By setting the ventilation resistance to 1.0 mmAq or more, the particle penetration can be lowered, that is, the QF value can be increased. The upper limit of the ventilation resistance is not particularly limited and 10 mmAq or less, preferably 8.0 mmAq or less. By using an electret whose ventilation resistance is within the above range, high initial efficiency can be achieved, so that the electret of the present invention is suitable for an air purifier and an air conditioning filter.

A fineness in the electret of the present invention is preferably 0.5 to 15 μm, more preferably 0.7 to 10 μm, further preferably 0.9 to 7 μm, and most preferably 1.0 to 3.5 μm. The fineness is calculated by using a scanning electron microscope by measuring fiber diameters of 50 fibers which do not overlap each other in one visual field to calculate a geometric mean. In a case where the fiber is too thin, clogging or yarn breakage is likely to occur. In a case where the fiber is too thick, enhancement of efficiency and pleating become difficult due to increase of the thickness.

<Form of Electret>

The form of the electret according to the present invention is not particularly limited. The electret may be in any of forms of, for example, a fibrous product, an injection-molded product, a film, powder, and a particle. However, in a case where the electret is used as a filter for, for example, cleaning gas, the electret is preferably in the form of a fibrous product. As the electret of the present invention, an electret obtained by molding so as to have appropriate form and thickness according to usage can be used.

The fibrous product is preferably a fiber aggregate. Examples of the fiber aggregate include fibrous products such as woven/knitted fabrics formed of long fibers or short fibers, nonwoven fabrics, and cotton products, and fibrous products obtained from stretched films. The fiber aggregate refers to a fiber aggregate in a state where the fiber aggregate is confirmed to have a fibrous form when the surface of the electret is observed by a device such as a scanning electron microscope or an optical microscope, and at least a part of fibers of the fiber aggregate are melted and integrated with each other.

When the electret is used as a filter, the fiber aggregate is preferably a nonwoven fabric. As a method of obtaining a nonwoven fabric, employable are conventionally known methods such as methods for forming sheets from single component fibers, composite fibers such as sheath-core fibers and side-by-side fibers, or short fibers such as divided fibers by carding, air-laying, wet paper making methods or the like, methods for obtaining from continuous fibers by a spun-bonding method, a melt-blowing method, an electro-spinning method, a force-spinning method or the like. Especially, nonwoven fabrics obtained by a melt-blowing method, an electro-spinning method, or a force-spinning method which can easily obtain high density and fineness are preferable from the viewpoint of effective utilization of the mechanical collection mechanism, nonwoven fabrics obtained by a melt-blowing method, a melt-electro-spinning method, or a melt-force-spinning method are more preferable due to no necessity of treatment of a remaining solvent, nonwoven fabrics obtained by a melt-blowing method is particularly preferable.

The average fiber diameter of the fiber used in the fibrous material is preferably 0.001 to 100 μm, more preferably 0.1 to 20 μm, further preferably 0.2 to 10 μm, and particularly preferably 0.5 to 5 μm, and most preferably 1 to 3 μm. In a case where the fiber has the average fiber diameter of larger than 100 μm, it is difficult to obtain practical collecting efficiency, and efficiency is significantly reduced when electric charge is attenuated. In a case where the fiber has the average fiber diameter of less than 0.001 μm, production of the electret having electric charge applied thereto is difficult.

The fibrous product may be a product having a uniform structure obtained by a single production method and a single material, or may be a mixture obtained by using two or more kinds of materials which have different fiber diameters and are produced by different production methods and different materials.

<Electret Forming Method>

Although an electret forming method of the present invention is not particularly limited as long as characteristics are exhibited as desired when the electret is used, a method (liquid contact charging method) in which the fibrous product is brought into contact or collision with liquid is preferable. By the liquid contact charging method, the electret having enhanced filtering properties can be obtained. More specifically, a method in which the fiber aggregate is brought into contact or collision with liquid by suctioning, pressure-applying, spouting, or the like, is preferable.

In the liquid contact charging method, the liquid with which the fiber aggregate is brought into contact or collision is not particularly limited as long as characteristics are obtained as desired. In view of handleability and performance, the liquid is preferably water. The electric conductivity and pH of water vary according to, for example, a content of calcium ions or magnesium ions. Instead of water, liquid obtained by adding a sub-component (component other than water) to water may be used, and the electric conductivity and pH of the liquid can be adjusted by, for example, a kind or an amount of the sub-component to be added.

The liquid to be contacted or impinged in the liquid contact charging method preferably has a pH of 1 to 11, more preferably 3 to 9, and further preferably 5 to 7. Furthermore, the liquid to be contacted or impinged in the liquid contact charging method preferably has an electric conductivity of 100 μS/cm or less, more preferably 10 μS/cm or less, and further preferably 3 μS/cm or less.

<Others>

As the electret of the present invention, the layer can be used in combination with another constituent member if necessary. That is, the electret of the present invention can be used in combination with a pre-filter layer, a fiber protection layer, a reinforcing member, or a functional fiber layer and the like is also preferable.

Examples of the pre-filter layer and the fiber protection layer may include spun bond nonwoven fabrics, thermal bond nonwoven fabrics, foamed urethane, and the like, and examples of the reinforcing member may include thermal bond nonwoven fabrics, various kinds of nets, and the like. Further, examples of the functional fiber layer may include colored fiber layers for antibacterial purposes, antivirus purposes, and purposes of identification or design.

The electret of the present invention and a filter including the electret can be used widely owing to the functions obtained by the present invention such as dust collection, protection, ventilation, anti-fouling, water-proofness, and the like, and especially preferably usable as dust respirators, various types of air conditioning elements, air cleaners, cabin filters, and filters aimed at protection of various types of apparatuses.

This application claims priority to Japanese Patent Application No. 2019-151213, filed on Aug. 21, 2019. The entire contents of the specifications of Japanese Patent Application No. 2019-151213, filed on Aug. 21, 2019 are hereby incorporated by reference.

EXAMPLES

Hereinafter, embodiments of the present invention will be described. The test method is shown below.

(1) Concentration of Magnesium in Sample 0.5 g of a sample was weighed into a platinum crucible, and preliminarily carbonized to 400° C. on a hot plate. Thereafter, a type FO610 electric furnace manufactured by Yamato Scientific Co., Ltd. was used to perform incineration at 550° C. for eight hours. After the incineration, 3 mL of 6.0 N hydrochloric acid was added, acid-decomposition was performed on the hot plate at 100° C., and heating was performed until the hydrochloric acid was completely volatilized. After the acid-decomposition ended, 20 mL of 1.2 N hydrochloric acid was added, and the obtained product was used as a test liquid to be measured. An amount of magnesium in the test liquid was quantified by using a SPEC-TROBLUE-type ICP emission spectrometer manufactured by Hitachi High-Tech Science Corporation according to a calibration curve generated with standard solution of a target element, and the concentration of magnesium in the sample was obtained according to the following equation.

Concentration of magnesium in sample: A (ppm (=mg/kg))

Concentration of magnesium in the test liquid: B (mg/L)

Magnesium concentration measured in the same method as described above except that a sample was not used (sample was not weighed into a platinum crucible): C (mg/L)

$$A = (B - C) \times (20 \div 1000)(L)/(0.5 \div 1000)(kg)$$

(2) Ventilation Resistance

Each sample punched into 72 mm φ was attached to an adapter having an effective ventilation diameter of 50 mm φ, piping having an inner diameter of 50 mm where a microdifferential pressure gauge was connected was coupled vertically, ventilation was carried out at 10 cm/s, and ventilation resistance (pressure loss) was measured without throttling.

(3) Particle Penetration

Each sample punched into 72 mm φ was attached to an adapter having an effective ventilation diameter of 50 mm φ, and particle penetration was carried out with a filter by the following method using a light scattering type particle counter KC-01E manufactured by Rion Co., Ltd.

Evaluation particles: Airborne dust

Air velocity: 10 cm/s

Calculation of efficiency: The number of particles having particle diameters of 0.3 to 0.5 μm was measured by a light scattering calculation.

Particle penetration (%)=(the number of particles having particle diameters of 0.3 to 0.5 μm through the electret/ the number of particles having particle diameters of 0.3 to 0.5 μm before through the electret)

(4) Filter Material Quality Factor (QF)

The initial QF value was calculated by the following equation using values of the ventilation resistance measured in the above (2) and the particle permeability measured in the above (3).

$$QF \ [mmAq^{-1}] = -[\ln(\text{particle penetration}(\%)/100)]/[\text{ventilation resistance (mmAq)}]$$

Example 1

A product obtained by adding 0.00025 parts by mass of magnesium stearate (melting point: 88° C.) and 1 part by mass of Chimassorb (registered trademark) 944 manufactured by BASF as a hindered-amine-based compound to 100 parts by mass of polypropylene homopolymer having a magnesium concentration of not larger than 0.1 ppm and a melt flow rate (MFR) of 1200 g/10 minutes, was spun by using a meltblowing device at a resin temperature of 260° C. and an air temperature of 260° C., to obtain a fiber sheet having a weight per unit area of 20 g/m². Water having an electric conductivity of 0.7 μS/cm and a pH of 6.8 was caused to collide with the obtained fiber sheet to perform charging, and the obtained product was then left as it was at 100° C. for 30 minutes and thus dried, thereby obtaining an electret filter. The ventilation resistance was 3.60 mmAq, a QF value was 1.13 mmAq⁻¹, and a magnesium concentration was 7.8 ppm.

Examples 2 to 8 and Comparative Examples 1 to 4

Electret filters were each produced in the same manner as in example 1 except that an amount of magnesium stearate to be added was as indicated in Table 1.

Comparative Example 5

An electret filter was produced in the same manner as in example 5 except that a hindered-amine-based compound was not added.

Comparative Example 6

An electret filter was produced in the same manner as in example 5 except that the obtained fiber sheet was charged by corona discharge.

Results of the examples and the comparative examples are systematically indicated below in Table 1.

TABLE 1

| | Polypropylene homopolymer (parts by mass) | Magnesium stearate (parts by mass) | Hindered-amine (parts by mass) | Charging method |
|---|---|---|---|---|
| Comparative Example 1 | 100 | 0 | 1 | Water was caused to collide to perform charging |
| Comparative Example 2 | 100 | 0.00005 | 1 | Water was caused to collide to perform charging |
| Example 1 | 100 | 0.00025 | 1 | Water was caused to collide to perform charging |
| Example 2 | 100 | 0.0005 | 1 | Water was caused to collide to perform charging |
| Example 3 | 100 | 0.00075 | 1 | Water was caused to collide to perform charging |
| Example 4 | 100 | 0.00085 | 1 | Water was caused to collide to perform charging |
| Example 5 | 100 | 0.001 | 1 | Water was caused to collide to perform charging |
| Example 6 | 100 | 0.0015 | 1 | Water was caused to collide to perform charging |
| Example 7 | 100 | 0.002 | 1 | Water was caused to collide to perform charging |
| Example 8 | 100 | 0.0025 | 1 | Water was caused to collide to perform charging |
| Comparative Example 3 | 100 | 0.005 | 1 | Water was caused to collide to perform charging |
| Comparative Example 4 | 100 | 0.0075 | 1 | Water was caused to collide to perform charging |
| Comparative Example 5 | 100 | 0.001 | 0 | Water was caused to collide to perform charging |
| Comparative Example 6 | 100 | 0.001 | 1 | Corona discharge method |

TABLE 1-continued

|  | Magnesium concentration (ppm) | Ventilation resistance (mmAq) | Particle penetration (%) | QF value (mmAq$^{-1}$) |
|---|---|---|---|---|
| Comparative Example 1 | 0.1 or less | 3.55 | 7.0 | 0.75 |
| Comparative Example 2 | 1.5 | 3.47 | 4.7 | 0.88 |
| Example 1 | 7.8 | 3.60 | 1.7 | 1.13 |
| Example 2 | 16.3 | 3.70 | 0.4 | 1.52 |
| Example 3 | 26.2 | 3.68 | 0.3 | 1.58 |
| Example 4 | 30.4 | 3.65 | 0.3 | 1.61 |
| Example 5 | 38.6 | 3.71 | 0.4 | 1.48 |
| Example 6 | 56.1 | 3.62 | 1.0 | 1.28 |
| Example 7 | 76.5 | 3.63 | 1.5 | 1.15 |
| Example 8 | 98.7 | 3.64 | 2.2 | 1.05 |
| Comparative Example 3 | 199 | 3.58 | 10.5 | 0.63 |
| Comparative Example 4 | 302 | 3.45 | 17.2 | 0.51 |
| Comparative Example 5 | 38.6 | 3.42 | 21.5 | 0.45 |
| Comparative Example 6 | 38.6 | 3.51 | 14.5 | 0.55 |

According to examples 1 to 8, the electret filter that had proportions of the contained magnesium element and nitrogen-containing compound within the predetermined ranges and that was charged by collision of water, had a high QF value and enhanced filtering properties. For the electrets according to examples 1 to 8, a fineness was calculated as a geometric mean by measuring fiber diameters of 50 fibers which did not overlap each other in one visual field with a scanning electron microscope. The fineness of each of the electrets was in a range of 2 to 2.5 μm.

Meanwhile, in comparative examples 1 to 4, a proportion of the contained magnesium element was outside the predetermined range, and, thus, the QF value was low and the filtering properties were insufficient. In both of comparative example 5 in which a hindered-amine-based compound was not added, and comparative example 6 in which charging was performed by corona discharge, each of the QF value was low and each of the filtering properties were insufficient.

INDUSTRIAL APPLICABILITY

The electret of the present invention exhibits excellent filtering performance, and can thus be used as a filter in various applications such as dust protective masks and air cleaners.

The invention claimed is:

1. An electret comprising a polyolefin resin and a nitrogen-containing compound, wherein 0.1 to 5 parts by mass of the nitrogen-containing compound is contained to 100 parts by mass of the polyolefin resin, a proportion of a magnesium element contained in the electret is not less than 16.3 ppm and less than 30.4 ppm, and a QF value represented by the following formula is 1.52-1.61 mmAq-1 when particles having particle diameters of 0.3 to 0.5 μm are to be collected, where QF [mmAq-1]=−[ln (particle penetration (%)/100)]/[ventilation resistance (mmAq)].

2. The electret according to claim 1, comprising fatty acid magnesium salt.

3. The electret according to claim 1, wherein the nitrogen-containing compound contains a hindered-amine-based compound.

4. A filter comprising the electret according to claim 1.

* * * * *